United States Patent

Cui et al.

(10) Patent No.: US 10,333,381 B1
(45) Date of Patent: Jun. 25, 2019

(54) HIGH VOLTAGE START-UP CIRCUIT FOR ZEROING OF STANDBY POWER CONSUMPTION AND SWITCHING MODE POWER SUPPLY HAVING THE SAME

(71) Applicant: Magnachip Semiconductor, Ltd., Cheongju-si (KR)

(72) Inventors: Zhi Yuan Cui, Shenzhen (CN); Sang Hoon Jung, Seoul (KR); Dong Seong Oh, Incheon (KR); Byung Ki Kim, Seongnam-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 16/110,630

(22) Filed: Aug. 23, 2018

(30) Foreign Application Priority Data

Dec. 21, 2017 (KR) .......................... 10-2017-0177588

(51) Int. Cl.
| | |
|---|---|
| *H02M 1/36* | (2007.01) |
| *H02M 1/08* | (2006.01) |
| *H02M 3/335* | (2006.01) |
| *H02M 1/00* | (2006.01) |

(52) U.S. Cl.
CPC ......... *H02M 1/08* (2013.01); *H02M 3/33523* (2013.01); *H02M 2001/0048* (2013.01)

(58) Field of Classification Search
CPC .......... H02M 1/08; H02M 1/082; H02M 1/36; H02M 3/28; H02M 3/335; H02M 3/33523; H02M 3/33507; H02M 2001/0048
See application file for complete search history.

(56) References Cited

U.S. PATENT DOCUMENTS

| | | | |
|---|---|---|---|
| 5,285,369 A | 2/1994 | Balakrishnan | |
| 5,477,175 A | 12/1995 | Tisinger et al. | |
| 7,319,601 B2 | 1/2008 | Fagnani et al. | |
| 7,525,819 B2 | 4/2009 | Choi | |
| 8,629,631 B1* | 1/2014 | Rhodes | H02M 1/36 315/227 R |
| 10,248,145 B2* | 4/2019 | Ciomaga | G05F 1/575 |
| 10,250,128 B2* | 4/2019 | Unno | H02M 3/04 |
| 10,250,138 B2* | 4/2019 | Isham | G06F 1/26 |
| 10,250,210 B2* | 4/2019 | Mengad | H03F 3/45977 |
| 10,256,720 B2* | 4/2019 | Ozanoglu | H02M 3/04 |

(Continued)

*Primary Examiner* — Adolf D Berhane
(74) *Attorney, Agent, or Firm* — NSIP Law

(57) ABSTRACT

A high voltage start-up circuit includes a power supply terminal configured to supply power, a latch unit connected to the power supply terminal and comprising a first P-type Metal-Oxide-Semiconductor (PMOS) transistor, a first N-type metal-oxide semiconductor (NMOS) transistor connected to the first PMOS transistor, a second PMOS transistor, and a second NMOS transistor connected to the second PMOS transistor, wherein the transistors form a latch structure, a charge sharing unit comprising a first capacitor configured to supply a first voltage to a drain of the second PMOS transistor and a second capacitor configured to supply a second voltage to a drain of the first PMOS transistor, and a switching unit configured to form a current path that charges an external capacitor using a voltage supplied from the power supply terminal as a power voltage, based on the first voltage and the second voltage.

20 Claims, 6 Drawing Sheets

(56) References Cited

U.S. PATENT DOCUMENTS

| | | | |
|---|---|---|---|
| 2003/0169606 A1* | 9/2003 | Miermans | H02M 1/36 363/49 |
| 2007/0247879 A1* | 10/2007 | Yang | H02M 1/36 363/49 |
| 2012/0230069 A1 | 9/2012 | Tzeng et al. | |
| 2019/0020268 A1* | 1/2019 | Saito | H02M 1/32 |
| 2019/0028033 A1* | 1/2019 | Tang | H02M 3/33553 |
| 2019/0041884 A1* | 2/2019 | Bhattad | G05F 1/577 |

* cited by examiner

HIGH VOLTAGE START-UP CIRCUIT FOR ZEROING OF STANDBY POWER CONSUMPTION AND SWITCHING MODE POWER SUPPLY HAVING THE SAME

CROSS-REFERENCE TO RELATED APPLICATIONS

This application claims the benefit under 35 USC 119(a) of Korean Patent Application No. 10-2017-0177588 filed on Dec. 21, 2017 in the Korean Intellectual Property Office, the entire disclosure of which is incorporated herein by reference for all purposes.

BACKGROUND

1. Field

The following description relates to a high voltage start-up circuit for zeroing of standby power consumption. The following description also relates to a switching mode power supply having such a high voltage start-up circuit.

2. Description of Related Art

A switching mode power supply (SMPS) refers to an electronic power supply having a switching regulator that efficiently converts power. Start-up circuits are generally required for normal operation of an SMPS. The start-up circuits provide current paths and voltage paths when all the integrated circuits (ICs) are in an initial state, such that the ICs are able to operate properly.

The start-up circuits include a current path after the startup that is always in a turn-on state even after the startup in order to form a current path necessary for the startup of the SMPS. Therefore, standby power consumption has been large due to the presence of a current path after the startup.

Alternative technologies use a method of moving a current path to other positions after a startup in order to reduce standby power consumption of a start-up circuit.

However, because the alternative technologies are driven at a high voltage, such as 500 V-600 V, standby power consumption is still large even though the amount of current is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect a high voltage start-up circuit includes a power supply terminal configured to supply power, a latch unit connected to the power supply terminal and including a first P-type Metal-Oxide-Semiconductor (PMOS) transistor, a first N-type metal-oxide semiconductor (NMOS) transistor connected to the first PMOS transistor, a second PMOS transistor, and a second NMOS transistor connected to the second PMOS transistor, wherein the first PMOS transistor and the first NMOS transistor, and the second PMOS transistor and the second NMOS transistor, form a latch structure, a charge sharing unit including a first capacitor configured to supply a first voltage to a drain of the second PMOS transistor and a second capacitor configured to supply a second voltage to a drain of the first PMOS transistor, and a switching unit configured to form a current path that charges an external capacitor using a voltage supplied from the power supply terminal as a power voltage, based on the first voltage and the second voltage.

The first PMOS transistor may be turned on in response to the first NMOS transistor being turned off and the second PMOS transistor may be turned off in response to the second NMOS transistor being turned on.

The latch unit may not be configured to form a current path for charging the external capacitor and the switching unit may be configured to selectively form a current path for charging the external capacitor.

An increase rate of the first voltage may be greater than an increase rate of the second voltage.

The switching unit may include a third NMOS transistor including a gate for receiving the first voltage and a third PMOS transistor including a gate for receiving the second voltage.

The third NMOS transistor and the third PMOS transistor may be simultaneously turned on or simultaneously turned off.

A signal received by the gate of the first NMOS transistor and a signal received by the gate of the second NMOS transistor may be complementary.

The switching unit may be configured to block a current path for charging the external capacitor in response to a charging voltage of the external capacitor reaching a voltage.

In another general aspect, a switching mode power supply (SMPS) includes a high voltage terminal configured to supply a high voltage, a junction field-effect transistor (JFET) configured to clamp the high voltage to an intermediate voltage, and a high voltage start-up circuit configured to receive the intermediate voltage from a source of the JFET and outputting a power voltage for driving SMPS in response to the received intermediate voltage, wherein the high voltage start-up circuit includes a power supply terminal configured to supply the intermediate voltage, a latch unit connected to the power supply terminal and including a first P-type Metal-Oxide Semiconductor (PMOS) transistor, a first N-type Metal-Oxide Semiconductor (NMOS) transistor connected to the first PMOS transistor, a second PMOS transistor, and a second NMOS transistor connected to the second PMOS transistor, wherein the first PMOS transistor and the first NMOS transistor, and the second PMOS transistor and the second NMOS transistor, form a latch structure, a charge sharing unit including a first capacitor configured to supply a first voltage to a drain of the second PMOS transistor and a second capacitor configured to supply a second voltage to a drain of the first PMOS transistor, and a switching unit configured to form a current path that charges an external capacitor using a voltage supplied from the power supply terminal as a power voltage, based on the first voltage and the second voltage.

The SMPS may further include a comparator configured to compare a voltage, divided by a plurality of resistors from the voltage charged to the external capacitor, and a reference voltage.

The output of the comparator may take on a high level in response to the divided voltage being less than the reference voltage.

In another general aspect, a high voltage start-up circuit includes a high voltage input terminal configured to receive a high voltage from an outside source, a converter configured to output the received high voltage to a DC voltage, a latch unit connected to an output terminal of the converter, a charge sharing unit connected to the latch unit, including a pull-up capacitor and a pull-down capacitor, and a switching unit connected to the latch unit and the charge sharing unit, configured to charge an external capacitor with a power voltage.

The converter may be a junction gate field-effect transistor (JFET).

The high voltage start-up circuit may further include a comparator configured to generate a gate voltage used to control two N-type Metal-Oxide Semiconductor (NMOS) transistors based on a level of the charged power voltage, wherein the latch unit includes the two NMOS transistors.

The switching unit may be configured to block a current path in response to the power voltage reaching a level.

The latch unit may include a first P-type Metal-Oxide Semiconductor (PMOS) transistor and a first NMOS transistor that are turned on and off opposite to each other, and a source terminal of the first PMOS transistor may be connected to an output terminal of the converter.

The latch unit may further include a second PMOS transistor and a second NMOS transistor that are turned on and off opposite to each other A drain terminal of the first PMOS transistor and a gate terminal of the second PMOS transistor may be connected to each other, and a gate terminal of the first PMOS transistor and a drain terminal of the second PMOS transistor may be connected to each other.

The high voltage start-up circuit may further include an inverter connected between a gate terminal of the first NMOS transistor and a gate terminal of the second NMOS transistor.

The pull-up capacitor and the pull-down capacitor may be able to ignore parasitic capacitances.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
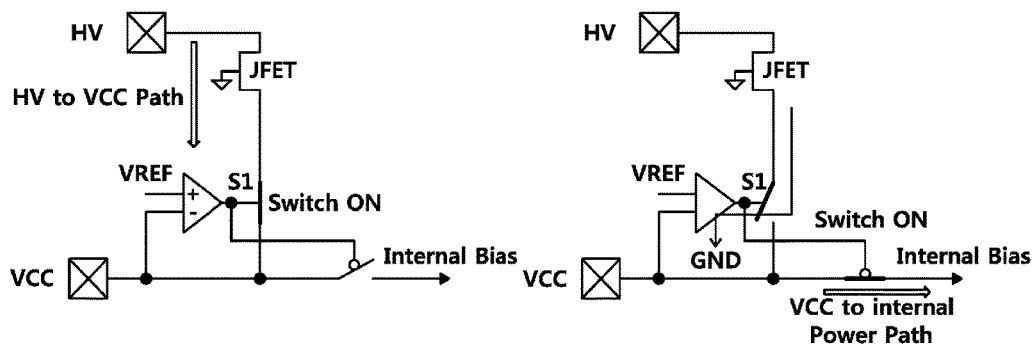
FIG. 1 is a circuit for explaining the basic concept of a start-up circuit.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Expressions such as "first conductivity type" and "second conductivity type" as used herein may refer to opposite conductivity types such as N and P conductivity types, and examples described herein using such expressions encompass complementary examples as well. For example, an example in which a first conductivity type is N and a second conductivity type is P encompasses an example in which the first conductivity type is P and the second conductivity type is N.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

The following examples are provided to solve the above-described problems and to introduce a high voltage start-up circuit for zeroing of standby power consumption, and a switching mode power supply having such a high voltage start-up circuit.

Figure 2:
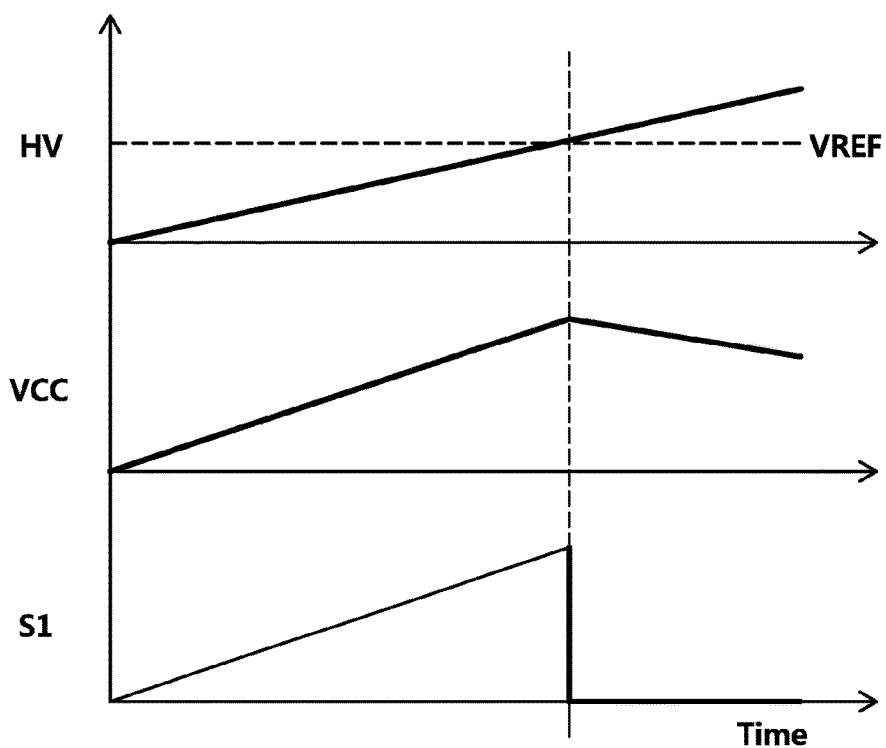
FIG. 2 is a time chart for explaining a startup mode in the circuit illustrated in the example of FIG. 1.

FIG. 1 is a circuit for explaining the basic concept of a start-up circuit, and FIG. 2 is a time chart for explaining a startup mode in the circuit illustrated in the example of FIG. 1. Referring to the example of FIG. 1, when a gate of a Junction Field-Effect Transistor (JFET) is connected to a ground and a high voltage, such as 500V-700V, is applied to a drain of the JFET, the voltage is clamped to an intermediate voltage such as 30V inside the JFET.

When a switch S1 is in a turn-on state, as a voltage applied to a start-up circuit increases, a power voltage VCC increases and the voltage applied to the start-up circuit reaches a reference voltage, at which point the switch S1 is turned off, as shown in the example of FIG. 2. In FIG. 2, the x-axis shows how the HV, VCC, and S1 change over time, with their voltages being represented by the y-axis.

Because the power voltage VCC is gradually discharged after the startup mode ends, a current path exists even when the switch S1 is in a turn-off state, in order to permit a startup mode again.

Figure 3:
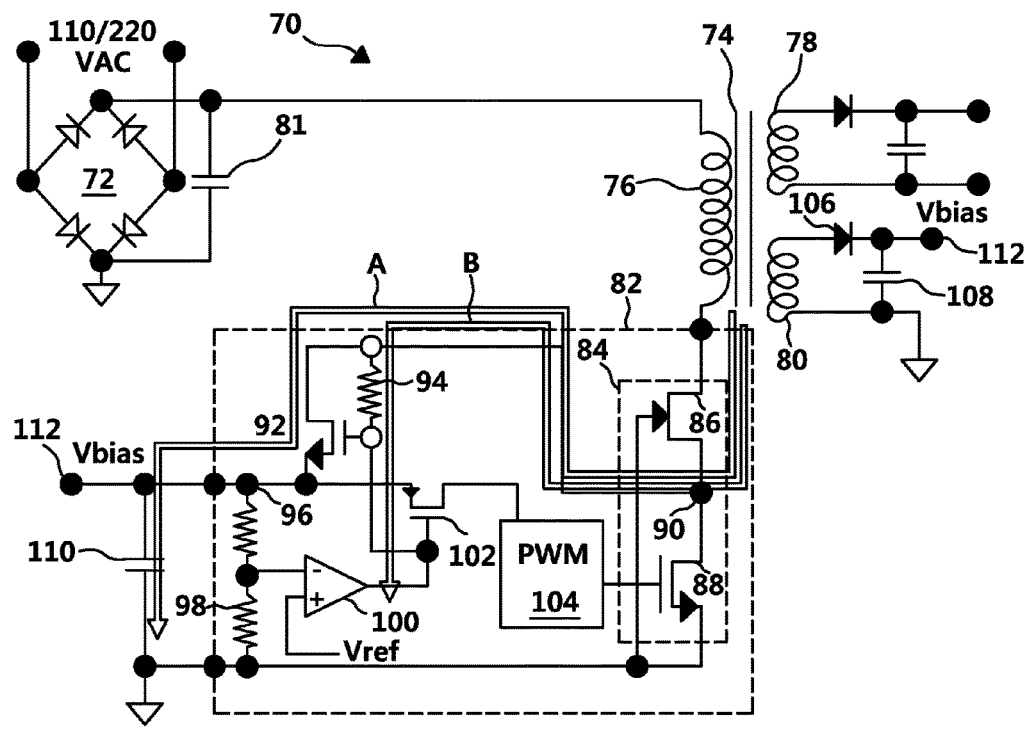
FIG. 3 is a drawing for explaining a start-up circuit in alternative technology.

FIG. 3 is a drawing for explaining a start-up circuit in alternative technologies. Referring to the example of FIG. 3, a full bridge 72 full-wave rectifier rectifies an alternating current voltage applied to it, and a full-wave rectified first voltage, for example, 260V, is inputted into a transformer. If a second voltage, for example, 650V, is applied to a drain of a JFET 86, a start-up circuit is applied with a predetermined voltage, for example, 30V, from a source terminal of the JFET 86.

An inverting terminal (−) of a comparator 100 is connected to a source terminal of the JFET 86, and thus the output of the comparator initially takes on a high level. The output of the comparator 100 is connected to each of a gate of an N-type metal-oxide semiconductor (NMOS) 92 and a gate of a P-type Metal-Oxide-Semiconductor (PMOS) 102, so that the NMOS 92 is turned on and the PMOS 102 is turned off.

The NMOS 92 is a diode connected by the connection between a drain and a gate of the NMOS 92, and accordingly, a capacitor 110 is charged with a voltage difference across a VCC terminal 112 and a ground. Thus, a first current path A is formed.

A voltage across the VCC terminal 112 is divided based on a resistance ratio between a first resistor 96 and a second resistor 98, and a voltage across the second resistor 98 is input into an inverting terminal (−) of the comparator 100. The reference voltage Vref is input to a non-inverting terminal (+) of the comparator 100. The comparator 100 compares the voltage input to the inverting terminal (−) and the reference voltage. If the voltage input to the inverting terminal (−) is greater than the reference voltage Vref supplied to the non-inverting terminal (+), the output of the comparator 100 becomes a low level value.

That is, if a voltage across the VCC terminal 112 reaches a certain voltage, the output of the comparator 100 takes on a low level, such that the PMOS 102 is turned on and the NMOS 92 is turned off. As the NMOS 92 is turned off, current flows through a resistor 94 and the comparator 100 to a ground. That is, a second current path B is formed accordingly.

As the PMOS 102 is turned on, a power supply voltage charged in the capacitor 110 is supplied to a Pulse Width Modulator (PWM) controller through the PMOS 102.

Because a second current path B exists after the startup of SMPS, standby power is consumed simultaneously.

Figure 4:
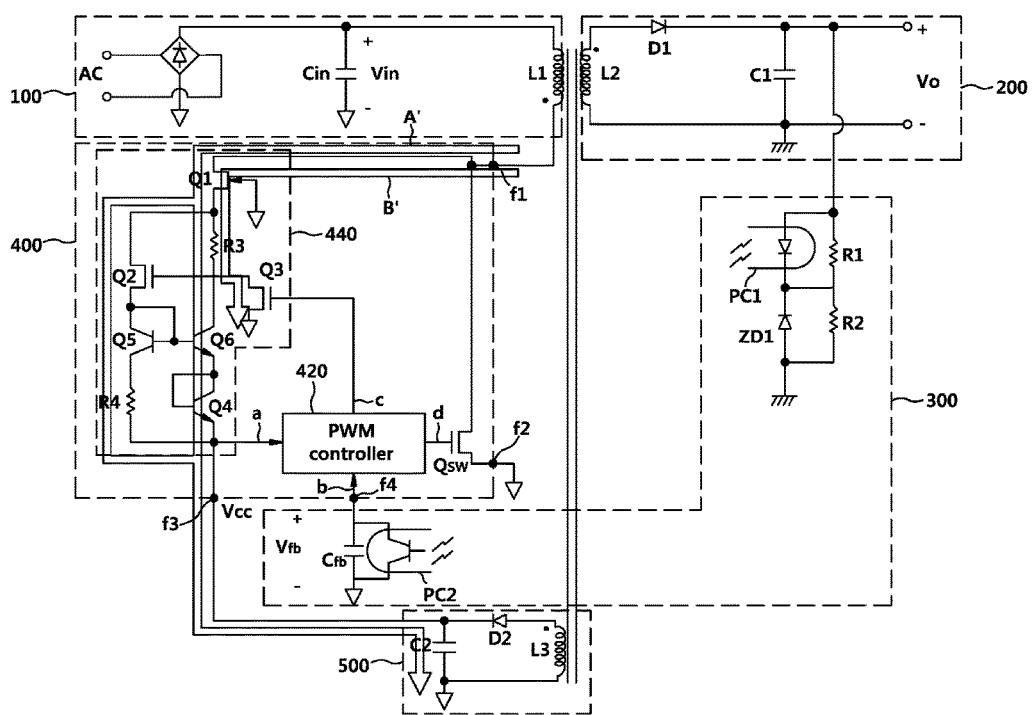
FIG. 4 is a drawing for explaining a start-up circuit in alternative technology.

FIG. 4 is a drawing for explaining a start-up circuit in alternative technology. Referring to the example of FIG. 4, initially a transistor Q3 is in a turn-off state, and a transistor Q2 is turned on due to a current flowing through a resistor R3 connected to a source terminal of JFET Q1. Therefore, a capacitor C2 is charged with a voltage difference across a VCC terminal f3 and a ground. That is, a first current path A' is formed.

Because an emitter terminal of a transistor Q4 is connected to a VCC terminal f3, the transistor Q3 is turned on if a voltage across the VCC terminal f3 reaches a predetermined voltage. As the transistor Q3 is turned on, current flows to a ground through a resistor R3 and the transistor Q3. That is, a second current path B' is formed as well.

Because a second current path B' exists after the start-up occurs, standby power is consumed as well.

Figure 5:
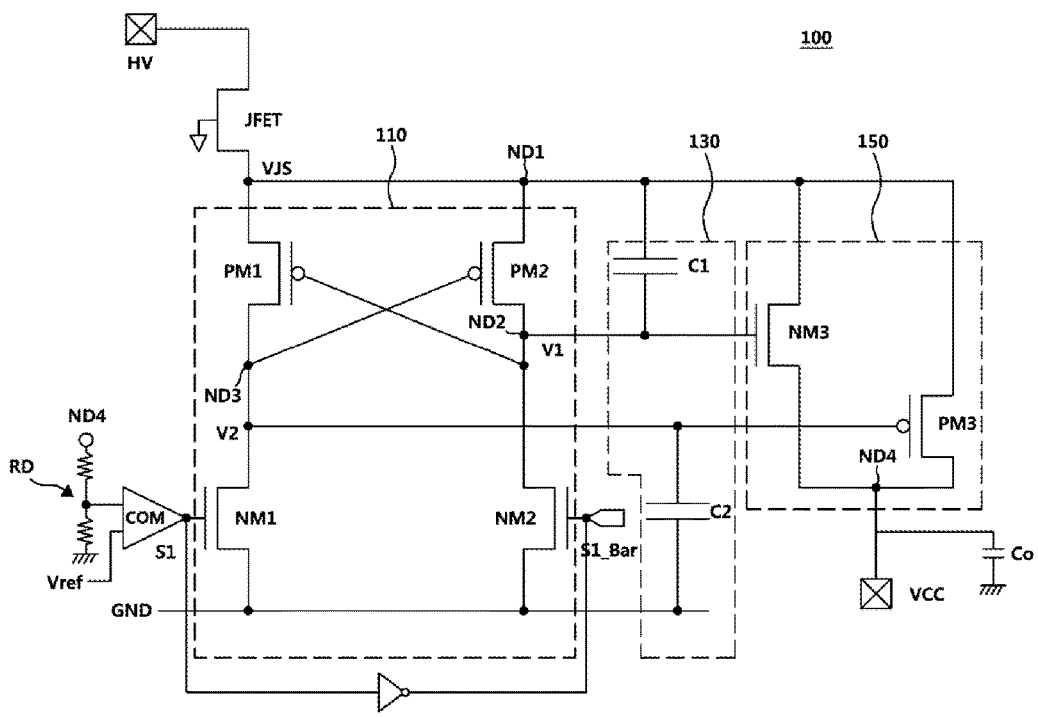
FIG. 5 is a circuit for explaining operations of an example of a start-up circuit.
Figure 6:
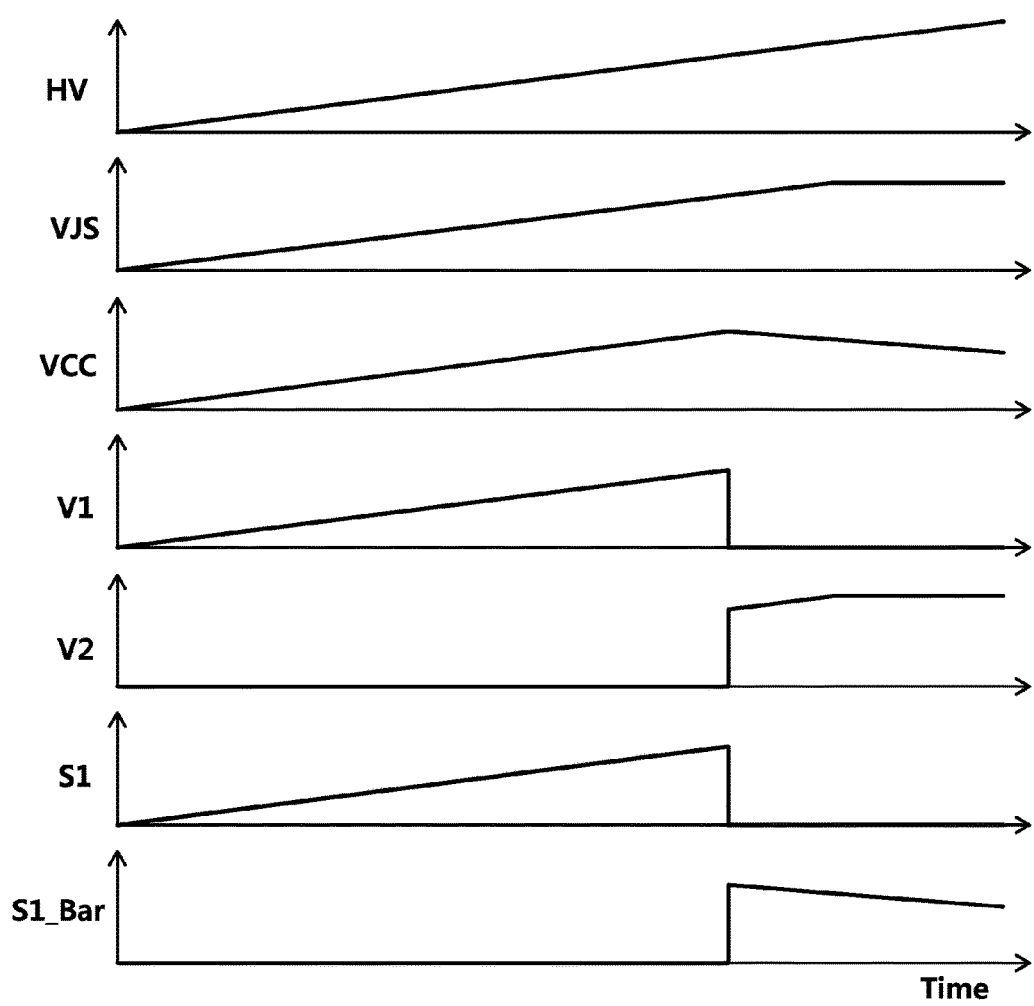
FIG. 6 is a time chart for explaining a startup mode in the circuit illustrated in the example of FIG. 5.

FIG. 5 is a circuit diagram for explaining operations of an example of a start-up circuit, and FIG. 6 is a time chart for explaining a startup process in the circuit illustrated in the example of FIG. 5. The examples allow current to be blocked after start-up by using a charge sharing technique and a latch structure together. Referring to the example of FIG. 5, a start-up circuit 100 may include a latch unit 110, a charge sharing unit 130, and a switching unit 150. For example the latch unit 110 may be a latch, the charge sharing unit 130 may be a charge sharer, and the switching unit 150 may be a switch.

The latch unit 110 may include a first PMOS transistor PM1, a second PMOS transistor PM2, a first NMOS transistor NM1, and a second NMOS transistor NM2. The examples use a latch structure in which the first PMOS transistor PM1 and the first NMOS transistor NM1 are turned on and off in a manner opposite to each other and the second PMOS transistor PM2 and the second NMOS transistor NM2 are turned on and off in a manner opposite to each other.

The first PMOS transistor PM1 is connected between a first node ND1 and a third node ND3, and the first PMOS transistor PM1 includes a gate for receiving a first voltage V1. The second PMOS transistor PM2 is connected between the first node ND1 and a second node ND2, and the second PMOS transistor PM2 includes a gate for receiving a second voltage V2.

The first NMOS transistor NM1 is connected between the third node ND3 and a ground, and includes a gate for receiving an output signal S1 of a comparator COM. The second NMOS transistor NM2 is connected between the second node ND2 and a ground, and it includes a gate for receiving a complementary signal S1_Bar concerning an output signal S1 of the comparator.

The charge sharing unit 130 may include a full-up capacitor C1 and a full-down capacitor C2. The start-up circuit 100 uses a difference in voltages across each capacitor of full-up capacitor C1 and a full-down capacitor C2, because charge balance between the pull-up capacitor C1 and the pull-down capacitor C2 is not matched.

The switching unit 150 may include a third NMOS transistor NM3 and a third PMOS transistor PM3. Through using the third NMOS transistor NM3 and the third PMOS transistor PM3, a capacitor Co is charged to produce a voltage difference between a fourth node ND4 and a ground.

The third NMOS transistor NM3 is connected between the first node ND1 and the fourth node ND4, and includes a gate for receiving a voltage V1 of the second node ND2. The third PMOS transistor PM3 is connected between the first node ND1 and the fourth node ND4, and includes a gate for receiving a voltage V2 of the third node ND3.

Startup Mode

A discussion of startup mode, according to an example, is presented below.

A drain of a JFET is connected to a first power node HV, and a source VJS of the JFET is connected to a first node ND1 and a gate of the JFET is connected to a ground. If a high voltage is initially applied from the first power node HV, current is supplied to the start-up circuit 100 through the JFET.

Because the pull-up capacitor C1 is connected to the source terminal VJS of the JFET, a voltage V1 of a second node ND2 increases accordingly. Because the pull-down capacitor C2 is connected between the third node ND3 and a ground, the capacitor C2 is charged accordingly. Therefore, in such an example, the voltage V1 of the second node ND2 increases more quickly than the voltage V2 of the third node ND3.

As illustrated in the example of FIG. 6, as a voltage applied to a start-up circuit increases, a voltage across a source terminal VJS of the JFET and a voltage V1 of a second node ND2 are increased as well. FIG. 6 shows how a number of voltage values change over time, such that its x-axis represents time and its y-axis represents a voltage level for each of the voltage values shown in FIG. 6. Additionally, a voltage V2 of the third node ND3 increases relatively slowly, as compared with the voltage V1 of the second node ND2.

Referring to the example of FIG. 5, because the voltage V1 of the second node ND2 increases faster than the voltage V2 of the third node ND3, accordingly the first PMOS transistor PM1 is turned off, the second PMOS transistor PM2 is turned on, the third NMOS transistor NM3 is turned on, and the third PMOS transistor PM3 is turned on.

Therefore, during the startup mode, the third NMOS transistor NM3 and the third PMOS transistor PM3 are always in turn-on states according to a positive feedback phenomenon of the latch unit 100 and the charge sharing unit 130.

The capacitor Co is charged in response to a voltage difference between the fourth node ND4 and a ground through the third NMOS transistor NM3 and the third PMOS transistor PM3. As illustrated in the example of FIG. 6, as a voltage applied to a start-up circuit increases, a power voltage VCC is increased accordingly.

A voltage across the fourth node ND4 is divided based on a resistance ratio of resistors connected to the fourth node ND4, and a divided voltage and a reference voltage Vref is input into a comparator 100. The comparator 100 compares the divided voltage with the reference voltage Vref, and the output of the comparator 100 takes on a high level if the divided voltage is less than the reference voltage Vref. Therefore, the first NMOS transistor NM1 is turned on, and the second NMOS transistor NM2 is turned off.

The first NMOS transistor NM1 is turned on if the first PMOS transistor PM1 is turned off. The second NMOS transistor NM2 is turned off if the second PMOS transistor PM2 is turned on.

After Start-Up

A discussion of how operation occurs, after the startup mode, according to an example, is presented below.

If a voltage VCC of the fourth node ND4 reaches a predetermined voltage, the output of the comparator 100 takes on a low level, and the first NMOS transistor NM1 is turned off and the second NMOS transistor NM2 is turned on accordingly.

If the first NMOS transistor NM1 is turned off and the second NMOS transistor NM2 is turned on, the first PMOS transistor PM1 is turned on and the second PMOS transistor PM2 is turned off accordingly.

Accordingly, a voltage across the second node ND2 takes on a low level, and a voltage V2 across the third named node ND3 takes on high level, and the third NMOS transistor and the third PMOS transistor are turned off accordingly.

Therefore, because a latch unit 110 becomes a latch structure after startup, no current path is formed. In this manner, a switching unit 150 is turned off such that no current path is formed. That is, because the current path is completely shut off after the startup mode, the consumption of the standby power is zeroed. Such a zero standby power is desirable so as to reduce the energy requirements of operating the circuit.

The states of the transistors before the startup mode and after the startup mode are summarized in Table 1 below.

TABLE 1

| Transistor | Startup mode | After startup |
|---|---|---|
| PM1 | OFF | ON |
| PM2 | ON | OFF |
| NM1 | ON | OFF |
| NM2 | OFF | ON |
| NM3 | ON | OFF |
| PM3 | ON | OFF |

Figure 7:
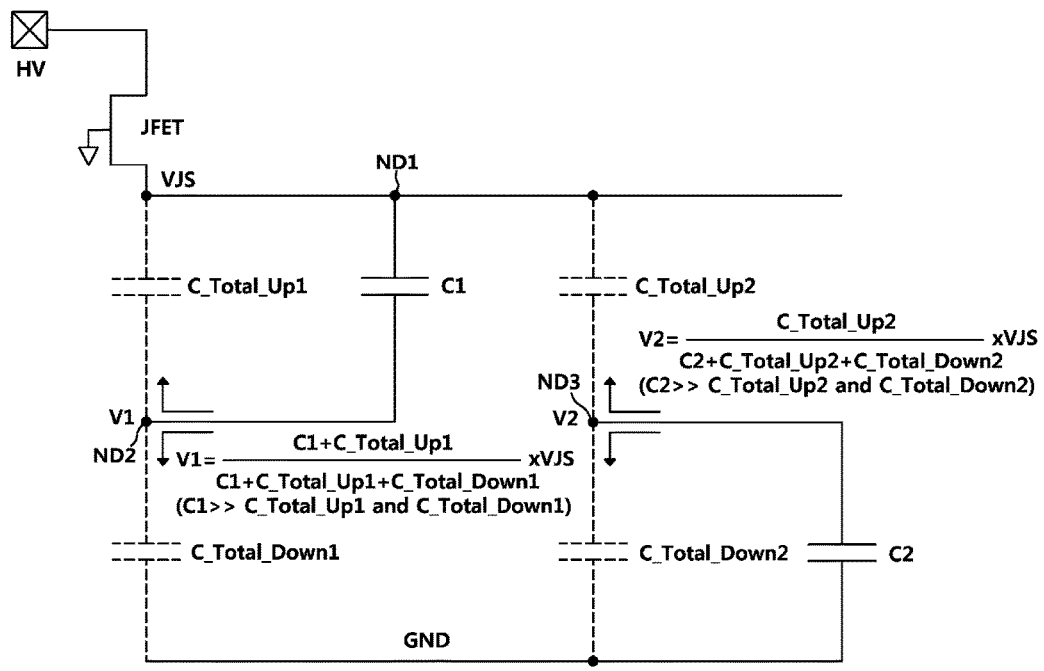
FIG. 7 is a conceptual diagram for explaining a voltage during a startup mode according to the examples.

FIG. 7 is a conceptual diagram for explaining an initial voltage during startup mode according to the examples. Referring to the examples of FIGS. 5 and 7, a voltage V1 across a second node ND2 is found by Equation 1, and a pull-up capacitor C1 is large enough to ignore parasitic capacitances seen from the node ND2, as per Condition 1. Thus, the voltage V1 across the second node ND2 becomes close to the voltage VJS applied into the source of the JFET.

$$V1 = \frac{C1 + C\_Total\_Up1}{C1 + C\_Total\_Up1 + C\_Total\_Down1} \times VJS \quad \text{(Equation 1)}$$

$$C1 >> C\_Total\_Up1 \text{ and } C\_Total\_Down1 \quad \text{(Condition 1)}$$

Because the voltage V2 across the third node ND3 is equal to Equation 2, below, and the pull-down capacitor C2 is large enough to ignore parasitic capacitances seen from the node ND3, as per Condition 2. Thus, the voltage V2 across the third node becomes close to zero.

$$V2 = \frac{C\_Total\_Up2}{C2 + C\_Total\_Up2 + C\_Total\_Down2} \times VJS \quad \text{(Equation 2)}$$

$$C2 >> C\_Total\_Up2 \text{ and } C\_Total\_Down2 \quad \text{(Condition 2)}$$

As described above, a high voltage start-up circuit for zeroing standby power consumption blocks current paths that exist after the startup of SMPS, thereby allowing the zeroing of the standby power consumption, improving energy use by the circuit.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A high voltage start-up circuit comprising:
a power supply terminal configured to supply power;
a latch unit connected to the power supply terminal and comprising a first P-type Metal-Oxide-Semiconductor (PMOS) transistor, a first N-type metal-oxide semiconductor (NMOS) transistor connected to the first PMOS transistor, a second PMOS transistor, and a second NMOS transistor connected to the second PMOS transistor, wherein the first PMOS transistor and the first NMOS transistor, and the second PMOS transistor and the second NMOS transistor, form a latch structure;
a charge sharing unit comprising a first capacitor configured to supply a first voltage to a drain of the second PMOS transistor and a second capacitor configured to supply a second voltage to a drain of the first PMOS transistor; and
a switching unit configured to form a current path that charges an external capacitor using a voltage supplied from the power supply terminal as a power voltage, based on the first voltage and the second voltage.

2. The high voltage start-up circuit of claim 1, wherein the first PMOS transistor is turned on in response to the first NMOS transistor being turned off and the second PMOS transistor is turned off in response to the second NMOS transistor being turned on.

3. The high voltage start-up circuit of claim 1, wherein the latch unit is not configured to form a current path for charging the external capacitor and the switching unit is configured to selectively form a current path for charging the external capacitor.

4. The high voltage start-up circuit of claim 1, wherein an increase rate of the first voltage is greater than an increase rate of the second voltage.

5. The high voltage start-up circuit of claim 1, wherein the switching unit comprises a third NMOS transistor comprising a gate for receiving the first voltage and a third PMOS transistor comprising a gate for receiving the second voltage.

6. The high voltage start-up circuit of claim 5, wherein the third NMOS transistor and the third PMOS transistor are simultaneously turned on or simultaneously turned off.

7. The high voltage start-up circuit of claim 1, wherein a signal received by the gate of the first NMOS transistor and a signal received by the gate of the second NMOS transistor are complementary.

8. The high voltage start-up circuit of claim 1, wherein the switching unit is configured to block a current path for charging the external capacitor in response to a charging voltage of the external capacitor reaching a voltage.

9. A switching mode power supply (SMPS) comprising:
a high voltage terminal configured to supply a high voltage;
a junction field-effect transistor (JFET) configured to clamp the high voltage to an intermediate voltage; and
a high voltage start-up circuit configured to receive the intermediate voltage from a source of the JFET and outputting a power voltage for driving SMPS in response to the received intermediate voltage,
wherein the high voltage start-up circuit comprises
a power supply terminal configured to supply the intermediate voltage,
a latch unit connected to the power supply terminal and comprising a first P-type Metal-Oxide Semiconductor (PMOS) transistor, a first N-type Metal-Oxide Semiconductor (NMOS) transistor connected to the first PMOS transistor, a second PMOS transistor, and a second NMOS transistor connected to the second PMOS transistor, wherein the first PMOS transistor and the first NMOS transistor, and the second PMOS transistor and the second NMOS transistor, form a latch structure;
a charge sharing unit comprising a first capacitor configured to supply a first voltage to a drain of the second PMOS transistor and a second capacitor configured to supply a second voltage to a drain of the first PMOS transistor, and
a switching unit configured to form a current path that charges an external capacitor using a voltage supplied from the power supply terminal as a power voltage, based on the first voltage and the second voltage.

10. The SMPS of claim 9, further comprising a comparator configured to compare a voltage, divided by a plurality of resistors from the voltage charged to the external capacitor, and a reference voltage.

11. The SMPS of claim 10, wherein the output of the comparator takes on a high level in response to the divided voltage being less than the reference voltage.

12. A high voltage start-up circuit comprising:
a high voltage input terminal configured to receive a high voltage from an outside source;
a converter configured to output the received high voltage to a DC voltage;
a latch unit connected to an output terminal of the converter;

a charge sharing unit connected to the latch unit, comprising a pull-up capacitor and a pull-down capacitor; and a switching unit connected to the latch unit and the charge sharing unit, configured to charge an external capacitor with a power voltage.

13. The high voltage start-up circuit of claim 12, wherein the converter is a junction gate field-effect transistor (JFET).

14. The high voltage start-up circuit of claim 12, further comprising a comparator configured to generate a gate voltage used to control two N-type Metal-Oxide Semiconductor (NMOS) transistors based on a level of the charged power voltage, wherein the latch unit comprises the two NMOS transistors.

15. The high voltage start-up circuit of claim 12, wherein the switching unit is configured to block a current path in response to the power voltage reaching a level.

16. The high voltage start-up circuit of claim 12, wherein the latch unit comprises a first P-type Metal-Oxide Semiconductor (PMOS) transistor and a first NMOS transistor that are turned on and off opposite to each other, and a source terminal of the first PMOS transistor is connected to an output terminal of the converter.

17. The high voltage start-up circuit of claim 16, wherein the latch unit further comprises a second PMOS transistor and a second NMOS transistor that are turned on and off opposite to each other.

18. The high voltage start-up circuit of claim 17, wherein a drain terminal of the first PMOS transistor and a gate terminal of the second PMOS transistor are connected to each other, and a gate terminal of the first PMOS transistor and a drain terminal of the second PMOS transistor are connected to each other.

19. The high voltage start-up circuit of claim 18, further comprising an inverter connected between a gate terminal of the first NMOS transistor and a gate terminal of the second NMOS transistor.

20. The high voltage start-up circuit of claim 12, wherein the pull-up capacitor and the pull-down capacitor are able to ignore parasitic capacitances.

* * * * *